United States Patent
Lampert et al.

(10) Patent No.: US 7,731,845 B2
(45) Date of Patent: Jun. 8, 2010

(54) FUEL FILTER

(75) Inventors: Johannes Lampert, Remseck (DE); Andre Rösgen, Remshalden (DE)

(73) Assignee: Mann + Hummel GmbH, Ludwigsburg (DE)

(*) Notice: Subject to any disclaimer, the term of this patent is extended or adjusted under 35 U.S.C. 154(b) by 190 days.

(21) Appl. No.: 11/925,762

(22) Filed: Oct. 27, 2007

(65) Prior Publication Data

US 2008/0272046 A1 Nov. 6, 2008

(30) Foreign Application Priority Data

Oct. 27, 2006 (DE) .................. 10 2006 051 406

(51) Int. Cl.
*B01D 35/16* (2006.01)
*B01D 27/14* (2006.01)
*F02M 37/22* (2006.01)

(52) U.S. Cl. .................. 210/232; 210/248; 210/312; 210/314; 210/335

(58) Field of Classification Search .................. 210/232, 210/248, 314, 335, 312

See application file for complete search history.

(56) References Cited

U.S. PATENT DOCUMENTS

| 3,465,883 | A | * | 9/1969 | Jumper | .................. 210/307 |
| 5,462,658 | A | * | 10/1995 | Sem | .................. 210/172.1 |
| 5,788,859 | A | | 8/1998 | Biere | |
| 2002/0038780 | A1 | * | 4/2002 | Jokschas et al. | .................. 210/86 |
| 2006/0006109 | A1 | * | 1/2006 | Klein et al. | .................. 210/299 |

* cited by examiner

*Primary Examiner*—Thomas M Lithgow

(57) ABSTRACT

A fuel filter has a filter housing and an annular filter element arranged in the filter housing. Between the bottom of the filter housing and the bottom area of the filter element a water collecting chamber is formed. The filter element has a coalescing element and a particle filter element. Fuel flows radially from the interior to the exterior of the coalescing element and from the exterior to the interior of the particle filter element. A riser tube extends through the clean chamber and the raw chamber from the bottom of the filter housing to the top. The riser tube has a clean channel and a guide channel. A seal on the riser tube separates a clean chamber from a raw chamber of the filter. A water removal tube is arranged inside the guide channel for removing water from the water collecting chamber.

7 Claims, 1 Drawing Sheet

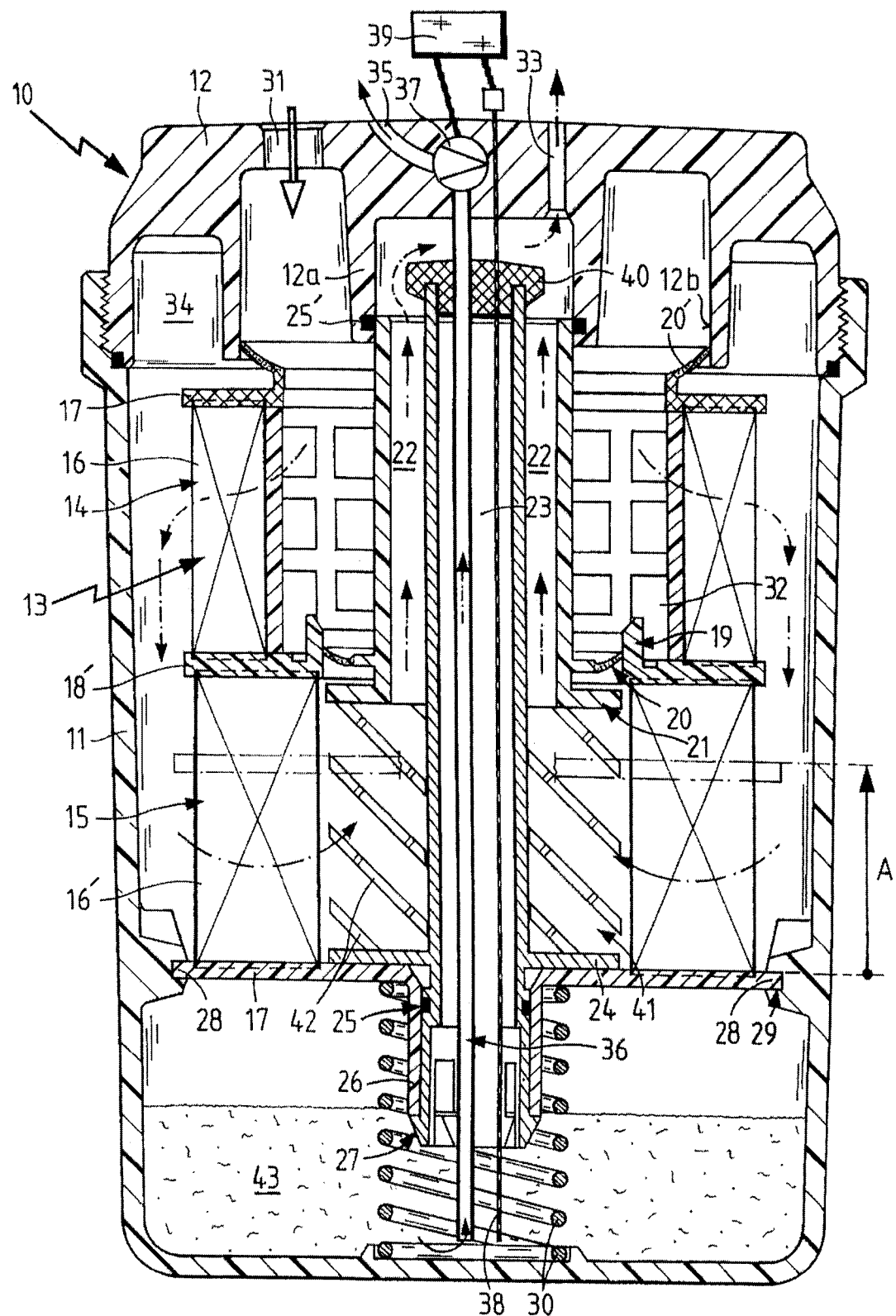

FUEL FILTER

BACKGROUND OF THE INVENTION

The invention relates to a fuel filter, in particular for internal combustion engines of motor vehicles. The fuel filter comprises a filter housing, a filter element, and a riser tube. The filter element is arranged in the filter housing such that in a bottom area between the filter element and the filter housing a water collecting chamber is formed. The filter element has an annular structure and comprises a coalescing element and a particle filter element, wherein flow passes through the coalescing element from the interior to the exterior and flow passes through the particle filter element from the exterior to the interior. A raw (unfiltered fluid) chamber is formed within the coalescing element and a clean (filtered fluid) chamber is formed within the particle filter element. The riser tube extends through the raw chamber and the clean chamber. The riser tube, on the one hand, forms a clean channel and, on the hand, a guide channel wherein the riser tube has sealing means for sealing the clean chamber and the raw chamber relative to one another.

U.S. Pat. No. 5,788,859 discloses a fuel filter that is screwed onto a filter top. The fuel filter has a housing comprised of a housing cup as well as a housing lid. The filter is configured as an exchangeable filter cartridge that cannot be opened. In the housing cup a single-stage filter element is provided that separates seal-tightly a raw side from a clean side. The raw side communicates with fuel inlets that are arranged in the housing lid. The fuel outlet that is also arranged in the housing lid is communicated with clean side. The clean side is enclosed by a filter element that is of a cylindrical hollow configuration. The raw side is formed between the housing cup and the filter element. When filtering the fuel, water that is contained in the fuel is prevented by the filter medium from reaching the clean side. Because water has a higher density than fuel, the water collects in the bottom area of the housing cup. The bottom area of the housing cup is connected by means of a riser tube to the filter top. In this way, the riser tube extends through the clean side wherein between the filter element and the riser tube seals are provided. All components are fixedly connected to one another so that an exchange of the filter medium requires the disposal of the entire fuel filter.

SUMMARY OF THE INVENTION

It is an object of the present invention to provide a fuel filter which, on the one hand, provides effective water separation and, on the other hand, enables comfortable water removal from the filter housing. Moreover, servicing should be possible so as to save resources.

In accordance with the present invention, this is achieved in that within the guide channel a water removal tube is arranged through which the water that collects in the water collecting chamber can be removed.

The fuel filter according to the invention serves for filtering fuel, for example, diesel fuel, in particular for internal combustion engines of motor vehicles. The fuel filter has a filter housing, a filter element, and a riser tube. The filter housing can be configured, for example, as an open cup that is provided at its open end with a thread with which the cup is screwed onto a filter top. Within the filter housing, the filter element is arranged such a that a water collecting chamber is formed at the bottom area. The filter element comprises a coalescing element and a particle filter element wherein these elements are comprised of an annular filter medium. At the end faces, end plates are arranged that are preferably made of plastic material. The coalescing element has a hydrophilic filter medium by means of which finely divided water droplets within the fuel are coalesced into larger drops. These larger drops subsequently sink toward the water collecting chamber. Preferably, fuel passes through the coalescing element from the interior to the exterior wherein, of course, with appropriate geometric shapes also a flow from the exterior to the interior can be provided. When flow from the interior to the exterior is provided, the interior of the coalescing element is the raw chamber.

The particle filter element has a filter medium that has hydrophobic properties and prevents the passage of water. Moreover, the filter medium is configured such that dirt particles are retained. For this purpose, the filter medium has a pore size that is matched to the particles to be filtered out. Fuel passes through the particle filter element preferably from the exterior to the interior so that in the interior of the particle filter a clean chamber is formed.

In the interior of the filter element, the riser tube extends through the raw chamber and the clean chamber. In this connection, the riser tube has sealing means that are suitable for sealing the raw chamber relative to the clean chamber. The riser tube is configured such that, on the one hand, a clean channel and, on the other hand, a guide channel is formed. The clean channel communicates with the clean chamber so that the filtered fuel can be removed from the fuel filter. Within the guide channel a water removal pipe is arranged through which water is removed from the fuel filter. The fuel removal pipe can be made from metal or plastic material. Moreover, the fuel removal pipe can be a stiff pipe or a flexible pipe.

According to an advantageous configuration, the riser tube has a snap-on device with which the riser tube can be secured on the filter element. For accomplishing this, the riser tube is pushed through the interior of the filter element and locked at the bottom end plate. In this way, a fixed connection between the filter element and the riser tube is formed which enables a simple mounting of the filter element.

It advantageous that the riser tube has support elements for supporting the particle filter element. These support elements can be detachably or non-detachably connected to the riser tube. For this purpose, the support elements can be glued, fused or welded, or screwed to the riser tube. The support elements can advantageously be configured as a monolithic part of the riser tube. In this way, mounting and positioning of an additional support pipe is not required.

According to a further embodiment of the riser tube, the support elements are disk-shaped. In this way, on the one hand, a simple removal of the riser tube and, on the other hand, an optimal fuel flow to the clean channel is possible. The support elements can moreover have additional passages for improved fuel flow.

In advantageous embodiments, the support elements are arranged at an angle between 0 degrees and 90 degrees, preferably at an angle of 30 degrees to 60 degrees, even more preferred 45 degrees, relative to the longitudinal axis of the riser tube. Accordingly, an excellent supporting action and excellent flow are achieved. For an optimal support several parallel support elements are provided.

According to a further embodiment, the coalescing element and the particle filter element are connected to one another by a common intermediate disk. This intermediate disk is advantageously made from thermoplastic material. The filter media can be glued or welded/fused to the intermediate disk. Accordingly, the coalescing element and the particle filter element are aligned precisely relative to one another and are sealed relative to one another.

In an advantageous embodiment of the fuel filter according to the invention, a water sensor is provided that is arranged in the interior of the guide passage. In this way, water can be detected and water removal can be controlled. Advantageously, the water sensor is connected to a control unit that opens a valve or can switch on and off a pump for water.

BRIEF DESCRIPTION OF THE DRAWING

The only FIGURE shows a fuel filter according to the invention in a section view.

DESCRIPTION OF THE PREFERRED EMBODIMENTS

The fuel filter has a filter housing 10 with a housing cup 11 and a housing top 12. The housing cup 11 is seal-tightly screwed onto the housing top 12. In the housing cup 11, a filter element 13 is arranged that comprises a coalescing element 14 and a particle filter element 15. The filter elements 14, 15 are formed by a zigzag folded and annular circumferentially closed filter media 16 and 16' with end plates 17 arranged at the end faces. For this purpose, both filter elements 14, 15 have essentially the same outer diameter. The filter elements 14, 15 are arranged coaxially relative to one another wherein an intermediate disk 18 is seal-tightly connected with both filter media 16, 16' so that the intermediate disk 18, on the one hand, forms the bottom end plate of the coalescing element 14 and, on the other hand, the top end plate of the particle filter element 15. The intermediate disk 18 has a sealing collar 19 delimiting a circular cross-section. On this sealing collar 19, a sealing lip 20 rests. This sealing lip 20 is arranged on a riser tube 21 that extends through the filter elements 14, 15. The riser tube 21 together with the sealing lip 20 separates the interior of the coalescing element 14 and the interior of the particle filter element 15. The riser tube 21 comprises a clean channel 22 and a guide channel 23 arranged in the clean channel 22. The sealing lip 20 is arranged on the outer circumference of the clean channel 22 and contacts the inner circumference of the sealing collar 19. The guide channel 23 has an integral support element (support disk) 24 resting on the bottom end plate 17 of the particle filter element 15. Moreover, the guide channel 23 has on its outer circumference a sealing ring 25 that rests seal-tightly against a receiving projection 26 of the bottom end plate 17. By means of the sealing ring 25 the interior of the particle filter element 15 is sealed relative to the surrounding space between the filter element 13 and the filter housing 10. In order to prevent that the guide channel 23 changes its position in the filter element 13 in an uncontrollable way, snap-on hooks 27 are provided that in the mounted state are axially supported on the receiving projection 26.

The bottom end plate 17 has several radially projecting guide noses 28 that engage a guide groove 29 arranged on the housing cup 11. By means of the guide noses 28, the filter element 13 is positioned precisely within the housing cup 11. When detaching the housing cup 11 from the housing top 12, the guide noses 28 slip out of the guide groove 29. By means of the spring 30 arranged between the housing cup 11 and the filter element 13, the filter element 13 is pushed axially out of the housing cup 11 by travel A into the position illustrated in dash-dotted lines. In this way, a space is released that serves for receiving the fuel. The fuel level thus drops during disassembly so that no fuel is spilled when changing the filter element.

The housing top 12 has an inlet 31 that communicates with a raw (unfiltered fuel) chamber 32. The raw chamber 32 is defined between the outer diameter of the clean channel 22 and the inner diameter of the coalescing element 14. In this connection, a sealing ring 25' is arranged between the outer circumference of the clean channel 22 and a cylindrical receptacle 12a on the housing top 12; the sealing ring 25' prevents leakage between the raw chamber 32 and the interior of the clean channel 22. Moreover, a sealing lip 20' is arranged on the top end plate 17 of the filter element 13 and is supported within the geometric shape 12b of the housing top 12. In this way, the raw chamber 32 is separated from the surrounding space 34.

The housing top 12 has moreover an outlet 33 that communicates with the interior of the clean channel 22. Through this outlet 33 the filtered fuel can flow out of the fuel filter.

On the housing top 12 there is moreover a water outlet 35 that communicates by means of pump 37 with the water removal tube 36. The water removal tube 36 extends through the interior of the guide channel 23 and projects into the bottom area of the housing cup 11 where the separated water will collect. In order to be able to remove the water in a targeted fashion from the housing cup 11, a water sensor 38 is provided that is connected to a control unit 39. In order to prevent that the unfiltered water/fuel mixture can reach the clean area that is surrounding the guide channel 23, a sealing plug 40 is provided that closes off the guide channel 23. The sealing plug 40 is however penetrated by the water removal tube 36 and the water sensor 38.

The particle filter element 15 surrounds a clean chamber 41 into which the clean channel 22 opens. For radial support of the filter medium 16' support elements 42 are provided that are arranged on the wall of the guide channel 23. The support elements 42 are preferably arranged at an angle of 45 degrees relative to the center axis of the guide channel 23.

For filtering fuel coming from a fuel tank, the fuel to be filtered flows through the inlet 31 into the filter housing 10 and reaches the raw chamber 32. From the raw chamber 32 the fuel flows through the coalescing element 14 radially from the interior to the exterior and the water contained in the fuel in fine droplets will coalesce to larger drops. These larger drops sink as a result of their density to the bottom area of the housing cup 11 and collect within the water collecting space 43. The fuel from which the water has been removed flows through the particle filter element 15 and contaminants or particles are separated. The filtered fuel after having passed the particle filter element 15 is located within the clean chamber 41 from where the fuel flows through the clean channel 22 to the outlet 33 and exits from the fuel filter.

The water that has been separated and collected in the water collecting chamber 43 is detected by the water sensor 38. When a water level that is sufficiently high is detected, a corresponding signal of the control unit 39 switches on the pump 37. The pump 37 removes through water removal tube 36 the water from the water collecting space 43 and guides it through the water outlet 35 out of the filter housing 10. As soon as the water has been pumped out, the water sensor 38 detects that the water is removed and notifies the control unit 39. The control unit 39 then switches off the pump 37. Instead of the pump 37, it is also possible to provide a valve (not illustrated) that is opened or closed. The removal of water is then realized by means of the fuel pressure within the fuel filter.

The specification incorporates by reference the entire disclosure of German priority document 10 2006 051 406.8 having a filing date of Oct. 27, 2006.

While specific embodiments of the invention have been shown and described in detail to illustrate the inventive principles, it will be understood that the invention may be embodied otherwise without departing from such principles.

What is claimed is:

1. A fuel filter comprising:
   a filter housing having a bottom;
   an annular filter element arranged inside the filter housing,
      wherein between the bottom of the filter housing and a bottom area of the filter element a water collecting chamber is formed;
      wherein the filter element is comprised of a coalescing element and a particle filter element,
      wherein fuel flows radially from an interior of the coalescing element to an exterior of the coalescing element and
      wherein fuel flows radially from an exterior of the particle filter element to an interior of the particle filter element,
      wherein the interior of the coalescing element is a raw chamber and the interior of the particle filter element is a clean chamber;
   a riser tube extending through the clean chamber and the raw chamber from the bottom of the filter housing to a top of the filter housing,
      wherein the riser tube comprises a radially outer tube and a radially inner tubular guide channel member and wherein a clean channel is defined between the outer tube and said tubular guide channel member arranged interior to said outer tube and further comprises a guide channel defined by and interior to said guide channel member,
   a sealing means provided on the riser tube,
      wherein the sealing means separates the clean chamber from the raw chamber;
   a water removal tube arranged inside the guide channel,
      wherein water collecting in the water collecting chamber is removed through the water removal tube from the water collecting chamber.

2. The fuel filter according to claim 1, wherein the riser tube has a snap-on device with which the riser tube is secured on the filter element.

3. The fuel filter according to claim 1, wherein the riser tube has support elements that support the particle filter element.

4. The fuel filter according to claim 3, wherein the support elements are disk-shaped.

5. The fuel filter according to claim 3, wherein the support elements extend at an angle between 0 degrees and 90 degrees to longitudinal axis of the riser tube.

6. The fuel filter according to claim 1, wherein the filter element further comprises an intermediate disk wherein the coalescing element and the particle filter element are connected to one another by the common intermediate disk.

7. The fuel filter according to claim 1, comprising a water sensor arranged within the guide channel.

* * * * *